United States Patent [19]
Savinykh et al.

[11] Patent Number: 4,650,065
[45] Date of Patent: Mar. 17, 1987

[54] BELT CONVEYOR

[76] Inventors: Vitaly V. Savinykh, ulitsa Lenina, I, Kv. 139, Istra Moskovskoi oblasti; Robert S. Tilles, B. Rzhevsky pereulok, 2, kv. 9, Moscow; Jury A. Yakhontov, ulitsa D. Davydova, 7, kv. 28, Moscow; Vladimir A. Krasnov, 2-i Setunsky proezd. II, kv. 93, Moscow, all of U.S.S.R.

[21] Appl. No.: 812,245

[22] Filed: Dec. 23, 1985

[51] Int. Cl.⁴ .................. B65G 15/08; B65G 15/60
[52] U.S. Cl. ............................................... 198/828
[58] Field of Search ..................... 198/828, 826, 827

[56] References Cited
U.S. PATENT DOCUMENTS

3,100,042  8/1963  Lo Presti .................. 198/827
3,880,275  4/1975  Fischer et al. .............. 198/827

FOREIGN PATENT DOCUMENTS

346192  7/1972  U.S.S.R.

Primary Examiner—James B. Marbert
Attorney, Agent, or Firm—Burgess, Ryan & Wayne

[57] ABSTRACT

A belt conveyor having a frame located inside whereof are two lengthy pliable members which are interconnected by medial idlers. A plurality of side idlers are supported on fulcrum pins which make each an angle with a plane through the pliable members and are conneted to these members with provision for displacement integrally therewith in a vertical plane. Linking means are also provided for which connect each to the respective fulcrum pin with one end so as to make an angle therewith and are pivoted each to the frame at the outward sides of the pliable members with the other end with provision for unobstructed swinging in a plane perpendicular to the axis of the conveyor. Said pivoted joints are located substantially not below a plane through the pliable members.

10 Claims, 8 Drawing Figures

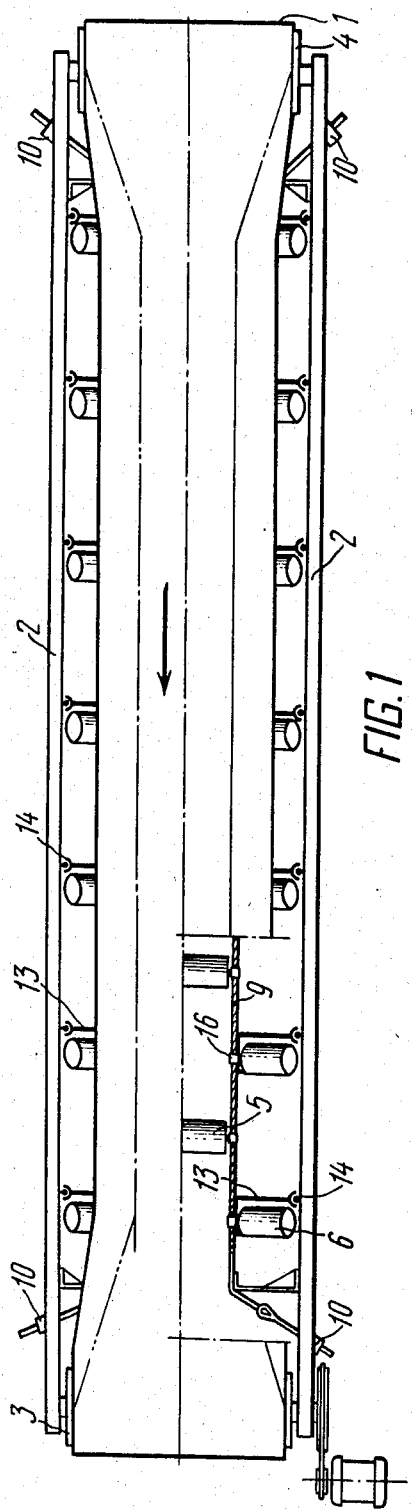
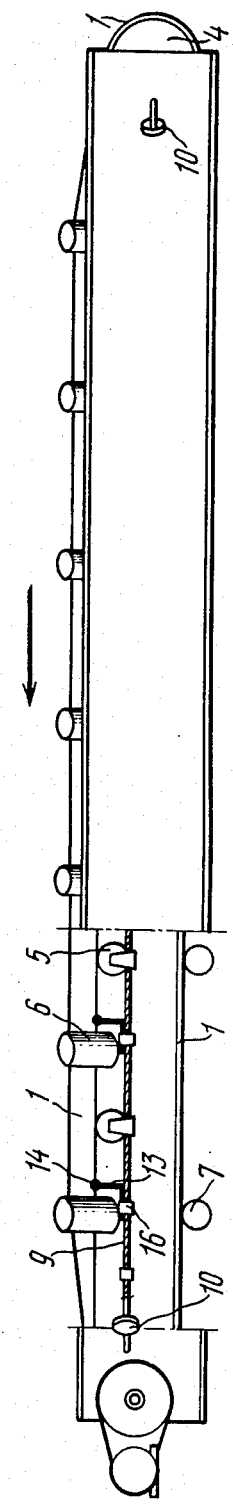

BELT CONVEYOR

TECHNICAL FIELD

The invention relates to materials handling equipment and is specifically concerned with belt conveyor having an andless load-carrying member.

The invention can be advantageous in conveying granular and sticky building materials on construction sites and in the building industry, large lump rock at mines.

BACKGROUND OF THE INVENTION

Whatever the application, effective operation of belt conveyors depends on mechanical and physical properties, size and shape of the loads handled. The larger the lumps a belt conveyor of a given design can accommodate and the faster the belt speed, the higher the effect of the equipment in operation. This is particularly true in the mining and building industries.

There is known, for example, a belt conveyor (cf. Rotec Creter Crane-125-24; Parts and Maintenance, Operation Instructions, Assembly and Safety; Rotec Industries, Inc.) incorporating an endless belt, a drive and a frame. A plurality of medial idlers flanked by inclined side idlers of the cantilever type at either end are fitted to the frame one next to the other. Top side idlers are provided at the sides of the belt sabstentially at right angles to a plane therethrough and in contact therewith to train the belt correctly apart from the medial and side idlers.

Giving speedy and effective service, this design is not free, however, from some shortcomings. It cannot handle large lumps because the top side idlers hamper their progress and because the impact loads they impose on the medial, side and top side idlers are detrimental to the integrity of the idlers lacking a shock-absorbing mounting. In training the belt along the axis of the conveyor, the top side idlers bear upon the belt edge within a narrow area of contact. The resultant unit load is high, bringing about ply separation and slipping of the belt, wear on top side idlers.

Not excluded is the possibility of ill-training the belt. It may result accidentally if, for example, the dirt or dust entering some of the bearings impedes the rotary motion of the idlers they support. Ill-training of the belt can also be caused by an out-of-square of idlers relative to the axis of the conveyor due to inaccurate installation of the conveyor. The known design is deprived of any means of controlling the path of the belt when the conveyor is in operation and train the belt accurately along the axis thereof so that the function of the top side idlers would be a standby one.

In practice, the training of the belt is accomplished in the following way. On spotting a malfunctioning idler which causes belt misalignment, the conveyor is stopped and the material it carries is unloaded. The faulty idler is turned through an angle in plan the magnitude whereof is selected by the person in charge subjectively, on the basis of his skill and experience. Commonly, this angle is 1°–3° as measured from a plane at right angles to the axis of the belt in the clockwise direction if the belt travels away from the point of observation and tends to misalign to the left. The idler turned as indicated interacts with the belt resiliently slipping past it and gives rise to a force which is applied to the belt and tends to displace this in the direction opposite to the direction of misalignment, bringing at balance the force which has caused the ill-training of the belt. However, the arbitrarily selected angle of turn and a possible mistake in identifying the exact idler causing the misalignment commonly render this method of control useless. Since no additional ways of controlling the training of the loaded belt on the go exists in this case, as this was pointed out above, the top side idlers contacting the belt edges are the last resort in spite of their rapid wear and ply separation of the belt.

Also known is a belt conveyor of another design (cf. USSR Inventor's Certificate No. 346,192; IPC B 65 g 21/04; dated Dec. 21, 1970) incorporating a study framework and at least two pliable load-carrying members of considerable length which are tensioned, extend inside the framework essentially parallel to each other and to the axis of the conveyor and are linked to said framework so as to be supported in a given position. The framework is also provided with a means of tensioning said pliable load-carrying members. A plurality of medial rolling means are located between the pliable members substantially at right angles thereto and are spaced a distance apart from one another along the conveyor. A plurality of fulcrum pins are located substantially at right angles to the pliable members so that their supporting ends are connected to the pliable members with provision for displacing integrally therewith in the vertical and horizontal planes. The fulcrum pins are disposed on either side of said pliable members externally thereto and spaced a distance apart from one another. They carry a plurality of side rollers. A plurality of linking means the number whereof equals that of the fulcrum pins is also provided for. The linking means are rods located substantially parallel to the fulcrum pins and rigidly attached each to the respective side rolling means (idler) and to the pliable member as well. Each linking means is also pivoted to the sturdy framework with one of its ends, whereby the pivoted joint between this linking means and the framework is located at the inward side of the respective pliable member below a plane through these members. The belt conveyor also incorporates an endless belt and a belt drive.

These features of the design enable the conveyor to handle large lump material at a speed not less than ever before. The rolling means (idlers) are so attached to both the framework (frame) and the pliable members that they can yield under impact loads, greatly reducing thereby the effect of these loads on components of idlers and frame. But there is evidence that belt training appears to be a problem in this case.

The recourse to top side idlers is hardly practicable, for it will limit the size of lump material handled due to reasons given above.

The tendency of the belt for ill-training seems to be unavoidable. It can be spurred spontaneously by a sluggish operation of a group of idlers due to dust in their bearings no matter how accurately these idlers have been fitted at right angles to the axis of the belt. The pliable members which are commonly steel wire ropes are likely to elongate in operation due to strain relaxation under tensile loads with the result that idlers, especially those at the sides, get out-of-true in plan and create favourable conditions for belt-misalignment forces to come into play. Since the linking means are located at the inward sides of the pliable members below a plane therethrough, the side idlers can yield under impact loads but the troughing of the belt decreases when the pliable members displace downwards. With the diminishing of the amount of troughing of the belt, the pressure the side idlers exert on the belt decreases and so does the tilt of these idlers. Thus conditions are created which facilitate belt misalignment. During a spontaneous occurence of the event, the pressure sustained by the side idlers towards which the belt displaces increases and that coming on the opposite side idlers decreases. The side idlers, being connected through the linking means to the pliable members which deform directly with the load they sustain, tilt at the side displacing towards which is the belt at a lesser degree than at the opposite side. Such positioning of the side idlers invites difficulties for the belt to return into alignment with the conveyor axis.

The known design also creates no prospect of controlling the position of side idlers when the belt is carrying load. An arbitrary adjustment of their position can be made only on stopping the conveyor. Therefore, accurate training of the belt is a formidable problem in operating the known conveyor.

Large and medium lumps of the material carried can collide with side idlers, causing these to deflect and vibrate. The amplitude of the vibration increases with the height of idlers so that the lumps contacting idler tops get an acceleration high enough for them to bounce off the belt.

It is an object of the invention to provide a belt conveyor of a design capable of conveying bulk and sticky building materials or large lump rock owing to an ability of the side rolling means to yield.

Another object of the invention is to ensure accurate belt training.

A further object of the invention is to create conditions permitting positional control of the rolling means to be exercised when the belt is on the go.

SUMMARY OF THE INVENTION

These objects are materialized in a belt conveyor comprising a sturdy framework extending full length of the conveyor; at least two lengthy pliable load-carrying members which run inside said framework substantially parallel to each other and to the axis of the conveyor and are linked to said framework so as to receive support in a given position relative thereto; a means of tensioning said pliable members inside said framework; a plurality of medial rolling means which are located between said pliable members substantially at right angles thereto and are spaced a distance apart from each other along thereof; a plurality of fulcrum pins located substantially at right angles to said pliable members so that the supporting ends of said fulcrum pins are connected to said pliable members with provision for displacing integrally therewith in the vertical and horizontal planes; a plurality of side rolling means which are fitted to said fulcrum pins on either side of said pliable members outwardly thereof and are spaced a distance apart from each other; a plurality of linking means each whereof is rigidly attached to the respective said fulcrum pin of side rolling means with one end, making an angle therewith, and is pivoted to said framework with provision for unobstructed swinging in a plane perpendicular to the axis of the conveyor with the other end; pivoting means which connect said other ends of said linking means to said framework and are located thereon along the outward sides of said pliable members substantially not below a plane therethrough; an endless conveyor belt resting on said medial and side rolling means; a drive of said conveyor belt.

This arrangement renders the side idlers capable of yielding under a load and reduces the amplitude of vibration at idler tops. The performance of the belt supporting means under impact loads improves to a point when large lumps can be carried without difficulty and with a lesser probability of being thrown off the belt. The fact that the pivoting means are located along the outward sides of the pliable members permits positional control of the side rolling means to be exercised when the belt is loaded and on the go so as to prevent its misalignment and thus improve the operational reliability of the disclosed conveyor. When the belt misaligns and moves to a side, the pressure on the side rolling means at this side increases and so does their tilt with the result that further sidewise displacement of the belt is checked. A decrease in the pressure on, and in the tilt of, the side rolling means at the opposite side of the belt facilitate the restoration of its alignment.

It is expedient to connect the linking means to the sturdy framework with provision for turning about their axes within a given limit. The side rolling means will then be able to tilt in the plane of the belt and in the direction of belt travel after colliding with lumps carried by the conveyor, whereby the angle of tilt will be greater at the top of the rolling means than at the bottom. The side rolling means will thus turn through a limited angle in the plane of the belt clockwise at the left-hand side of the belt and counter-clockwise at the right-hand one looking in the direction of belt travel. The contact of the belt with the side rolling means turned as indicated above gives rise to a force acting on the belt and directed towards the axis of the conveyor. When the belt travels in alignment with the axis of the conveyor, the side rolling means to the right and left of the belt average roughly an equal number of collisions with lumps in the same directions. The forces set up at the right- and left-hand side idlers are at balance and the belt training is correct. A sidewise displacement of the belt imposes a greater load on the side rolling means towards which shifts the belt than on the side rolling means at the opposite side and the forces resulting from collisions with lumps are higher at the former side rolling means than at the latter. The side rolling means exposed to higher forces tilt more heavily than their counterparts sustaining lighter forces, and the forces the former exert on the belt in the direction of the axis of the conveyor are higher than those coming from the latter. Thus, an aligning force equalling the difference between the opposing forces and tending to restore belt alignment comes into existence. The linking means which are capable of turning about their axes enhance the aligning potency of the disclosed design.

It is also expedient to connect the linking means to the framework so that the top ends of the side rolling means displace in the direction of belt travel when the linking means are being turned through a limited angle, whereby the rolling means tilt relative to the pliable members and the axis of the belt through an angle of 2°–3° with the perpendicular.

As already pointed out, the side rolling means tilting in this way facilitate the restoration of belt alignment. The optimum magnitude of the tilt has been determined experimentally. The force which is set up due to a belt-to-idler contact and acts sidewise increases directly with the tilt of the idler in the plane of the belt through an angle of 0°–3° with a plane perpendicular to the axis of the belt, but sharply decreases when the tilt is over 3°. The explanation is that over the range of tilt between 0° and 3° the belt slides over the idler with some amount of spring so that the side-wise directed force materializes due to a coefficient of static friction. When the tilt exceeds 3°, the belt sliding goes on uninterruptedly and the sidewise directed force materializes due to a coefficient of sliding friction which is smaller than the coefficient of static friction. The force in question consequently decreases sharply. It stands to reason that the tilt of the side rolling means between 0°and 3° is an optimum plan.

It is further expedient to connect the linking means to the fulcrum pins of side rolling means substentially at an angle of 10°-65°. The upper limit of the angle is decided by the elasticity of the belt and the lower one is defined by the ability of side rolling means to tilt in the plane of the belt.

It is preferred to connect the supporting ends of the fulcrum pins of side rolling means to the pliable members with the aid of longitudinal rests, whereby each of the rests is secured to the respective pliable member at least within a portion of its length making a right angle with the fulcrum pin that is attached to the rest.

This plan creates the most favourable condition for correct belt training, provided the factors which determine the amount of tilt (2° or 3° as indicated above) of the side rolling means in plan—the length of the rests, that of the portion of each rest secured to the pliable member and the tensioning of the pliable members—are selected correctly. The side rolling means need not be checked for perpendicularity with the axis of the conveyor in installing the conveyor if the fulcrum pins of these rolling means make right angles with those portions of the longitudinal rests which are secured to the pliable members.

The rests can be connected to the pliable members with provision for relative displacement, whereby each linking means will be capable of shifting along its axis within a limited distance and turning about the axis through a limited angle so as to provide for a deflection of the side rolling means through 2°-3° from the vertical to the pliable members. This will prevent the side rolling means from becoming out-of-square due to elongation of the pliable members under tensile loads. The same result can be obtained if the rests are rigidly secured to the pliable members within at least a portion of their length. The linking means must also be connected to the framework with provision for limited displacement therealong and turning about their axes through a limited angle.

It is also preferred that the fulcrum pins of side rolling means and the linking means are rigidly attached each to the respective rest at the opposite ends thereof and are so located on the conveyor that each fulcrum pin of side rolling means trails the respective linking means in the direction of belt travel.

Each of the pliable members attached whereto is the rest will bend in this case with the result that the mitigating belt training effect of the side rolling means will be enhanced.

The linking means can be made each integrally with the respective rest to simplify construction.

It is further preferred that the linking means are each connected to the framework with one of its ends with provision for changing the point of contact in the vertical direction. This will permit the control of the tilt of each side rolling means to be exercised when the belt is on the go, either loaded or not. An increase in the tilt of side rolling means within certain limits facilitates correct belt training as pointed out above.

BRIEF DESCRIPTION OF THE DRAWINGS

A preferred embodiment of the invention will now be described in detail by way of examples with reference to the accompanying drawings in which FIG. 1 is a schematic plan view of the conveyor according to the invention;

FIG. 2 is a side elevation of the conveyor shown in FIG. 1;

DETAILED DESCRIPTION OF THE INVENTION

Figure 3:
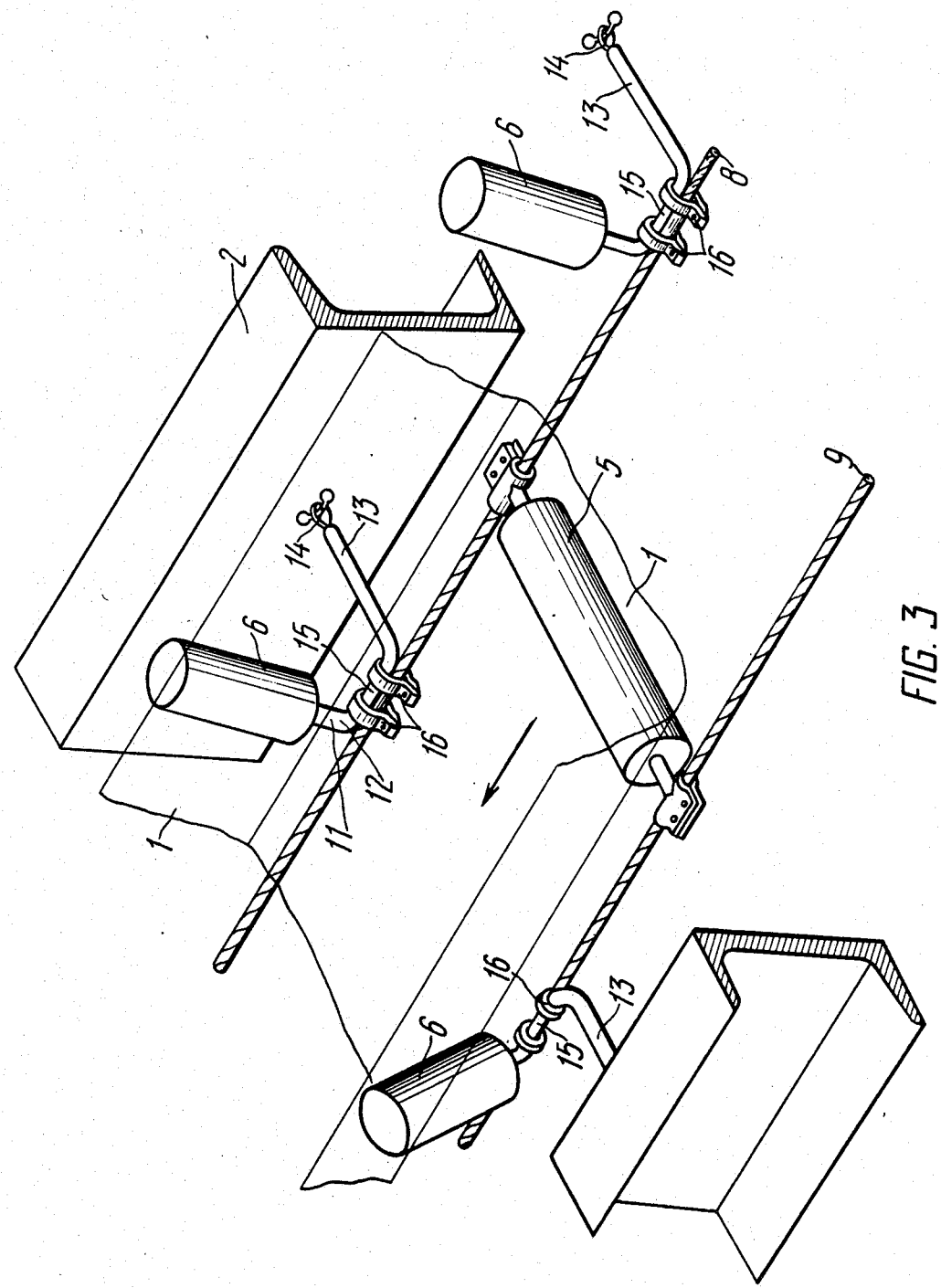
FIG. 3 is a general view of the framework, pliable load-carrying members, rolling and linking means, rests illustrating their mutual disposition according to the invention.

A belt conveyor comprises an endless belt 1, a sturdy framework 2, a drive pulley 3, a take-up pulley 4, medial rolling means 5 and side rolling means 6 which support the carrying run of the belt 2 and rolling means 7 resting whereon is the return run of the belt (FIGS. 1 and 2). A pair of pliable load-carrying members 8,9 operate inside the framework 2. Tensioning means 10 serve to tension the pliable members 8 and 9. The medial rolling means 5 (FIG. 3) are fitted between the pliable members 8,9 and are spaced a distance apart from each other. The side rolling means (idlers) 6 are fitted to fulcrum pins 11 which are located on either side of the pliable members 8,9 outwardly thereof and are spaced a distance apart from each other. The fulcrum pins 11 are located substantially at right angles to the pliable members 8,9 and their supporting ends 12 (FIGS. 3, 7 and 8) are connected to the pliable members 8, 9 with provision for displacing integrally therewith. Every fulcrum pin 11 giving support to the side idler 6 is provided with a linking means (tie rod) 13 which connects to the fulcrum pin 11 and makes an angle therewith. The tie rod 13 is connected to the framework 2 with one end with provision for unobstructed swinging in a plane at right angles to the axis of the conveyor. The connection of the tie rod 13 to the framework 2 is effected by means of a pivot 14 (FIG. 3). The tie rods 13, the fulcrum pins 11, the side idlers 6 and the pliable members (steel wire ropes) 8,9 are so located relative to each other that the tie rods 13 extend towards the framework 2 and are attached thereto by pivots 14 which are located not below a plane through the pliable members 8,9. The framework 2 can be provided in the form of a sturdy truss or a plurality of isolated stanchions which are made of rolled or extruded shapes and rest on a firm base (e.g. the ground). The framework will be referred to hereinafter as frame 2.

Figure 5:
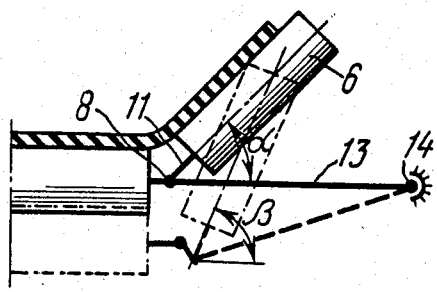
FIG. 5 is a view illustrating the operating principle of a side rolling means in a plane at right angles to the pliable load-carrying means.

This layout provides for yielding of idlers and therefore reduces the impact loads sustained by components of the belt conveyor. The medial idlers 5 deflect downwards after a collision with lumps of the material handled and side idlers 6 deflect in a plane perpendicular to the axis of the conveyor as shown in FIG. 5 by dashed lines. The tilt of the deflecting side idlers 6 increases whereby the amount of sidewise displacement of these idlers at the bottoms is greater than that at the tops. The attitude of side idlers during a collision with lumps minimizes the losses of material. A sidewise displacement of the belt out of alignment with the conveyor axis brings about a redistribution of the loading sustained by the wire ropes. A belt displacement to the right increases the load on the right-hand rope 8 and reduces that on the left-hand rope 9. The sagging of the right-hand rope 8 increases and that of the left-hand one 9 decreases with the result that the tilt of the side idlers 6 along the right-hand side of the belt increases whereas the side idlers 6 at the opposite side of the belt incline to a lesser degree. The belt responds by ceasing to displace sidewise and returning into the alignment with the conveyor axis.

The linking means (tie rods) 13 can be connected to the frame 2 so as to turn about their axes through a limited angle (FIG. 4) in addition to swinging in a plane at right angles to the axis of the conveyor. The side idlers 6 are then in a position to tilt in the plane of the belt, whereby the fulcrum pins 11 will incline out of square with the conveyor axis through a small angle defined by the tensioning of the wire ropes 8,9, the extent within which the fulcrum pins 11 of the side idlers 6 are secured each to the wire ropes 8,9 and some other factors considered hereinafter.

Figure 4:
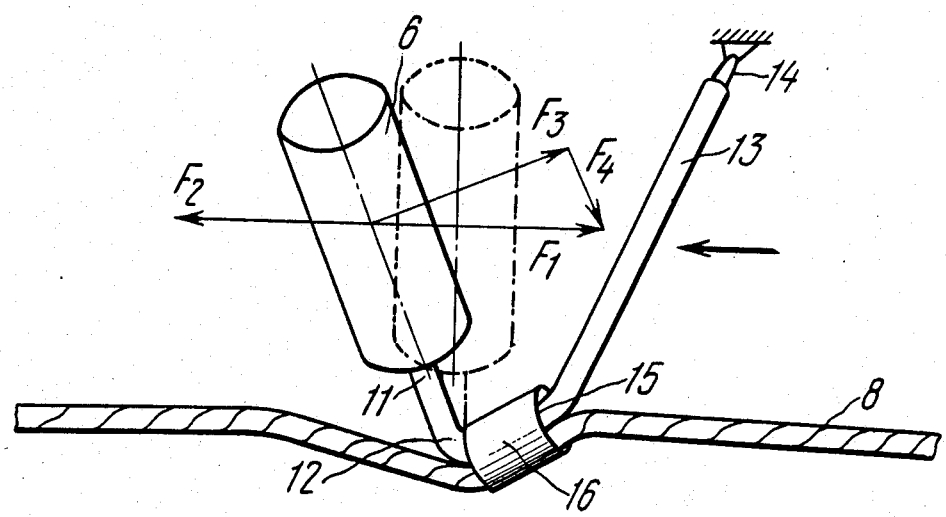
FIG. 4 is a view of a side rolling means depicting a diagram of the forces acting thereon and on the belt according to the invention.
Figure 6:
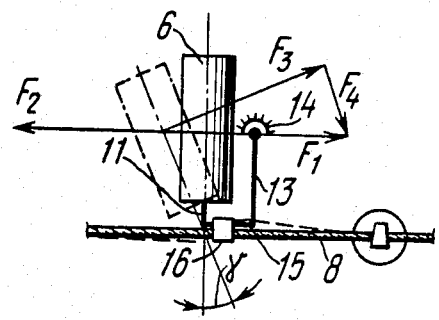
FIG. 6 illustrates the operating principle of a side rolling means in the plane through the belt and a diagram of the forces acting on the rolling means and belt.

Collisions of lump material with side idlers 6 in operation and the friction between the belt 1 and the side idlers 6 bring about a force $F_2$ which is applied to the idler 6 (FIG. 4). Since the tie rod 13 can turn about its axis, force $F_2$ causes the idler 6 to incline in the plane of the belt as shown in FIGS. 4 and 6 (the direction of belt travel is shown by arrows). In tilting, the idler 6 causes the respective wire rope 8 or 9 to bend resiliently so that the tilt of the idler 6 appears to be proportional to the force $F_2$ applied. In travelling past the side rollers 6 which are inclined as shown in FIGS. 4 and 6, the belt 1 gives rise to a force equalling $F_2$ in magnitude but opposing in direction. Denoted $F_1$, this force is resolved into a force $F_3$ resisting the revolution of the idlers 6 and an aligning force $F_4$ which causes the belt to displace towards the centre of the conveyor. As long as the belt operates being aligned with the conveyor axis, the aligning forces $F_4$ set up at left-hand side idlers 6 equal the forces $F_4$ at right-hand side idlers in magnitude but oppose them in direction. Should the belt 1 shift, for example, rightwards, the total impact load on, and the total resistance to the belt travel of, right-hand side idlers 6 increase and so does the tilt of these idlers, exceeding the tilt during the period of belt alignment. At the same time, the tilt of left-hand side idlers 6 decreases because of the number of collisions with lump material and the resistance to belt travel decreasing there. Since the sligning forces $F_4$ are proportional to the tilt of side idlers 6 in the plane of the belt, they increase at the right-hand side idlers 6 and decrease at the left-hand side idlers 6. The aligning forces $F_4$ at right-hand side idlers, towards which had displaced the belt 1, exceed the aligning forces at the left-hand side, and the resultant of these forces causes the belt to return into the alignment with the conveyor axis.

The fulcrum pins 11 of side idlers 6 should tilt in the plane of the belt through an angle $\gamma \leq 3°$ (see FIG. 6 in which the tilted position of a side idler is shown in dashed lines). Within the given range of the values of the angle $\gamma$ between 0° and 3°, the aligning force $F_4$ changes directly with the tilt of side idlers. The belt slides over side idlers 6 with some spring which reduces the wear on the belt due to contact with side idlers. A tilt of side idlers in excess of 3° brings about a constant belt-to-idler sliding contact which intensifies belt wear and causes the aligning force to decrease.

Figure 7:
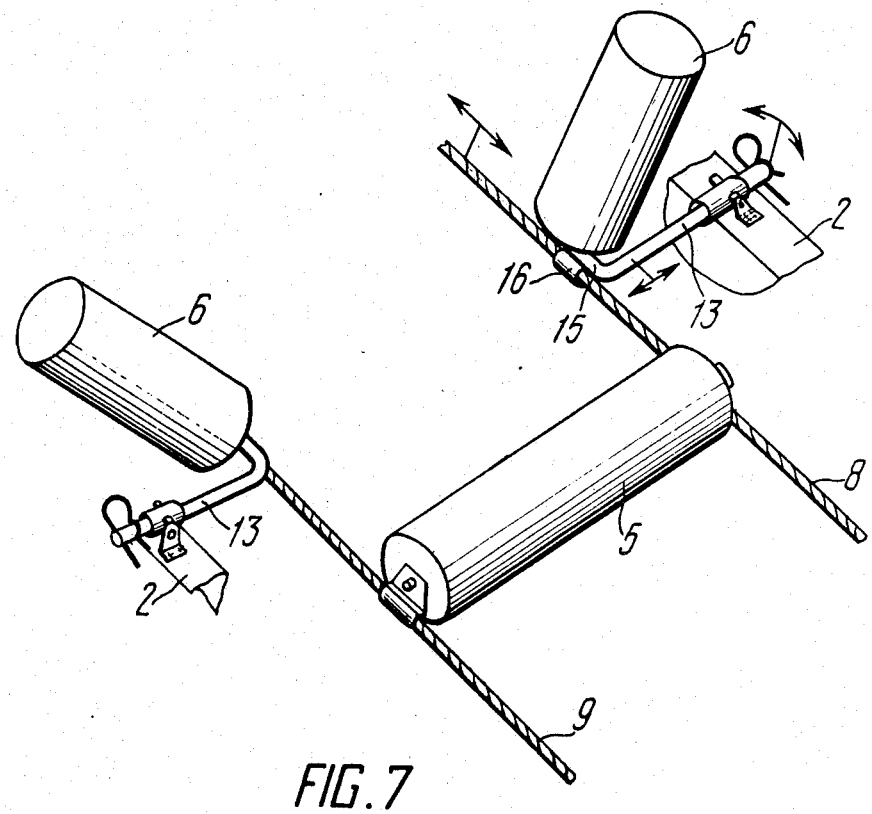
FIG. 7 illustrates the way the linking means are connected to the framework in an embodiment of the invention which provides for a movable link between every rest and the pliable load-carrying member.
Figure 8:
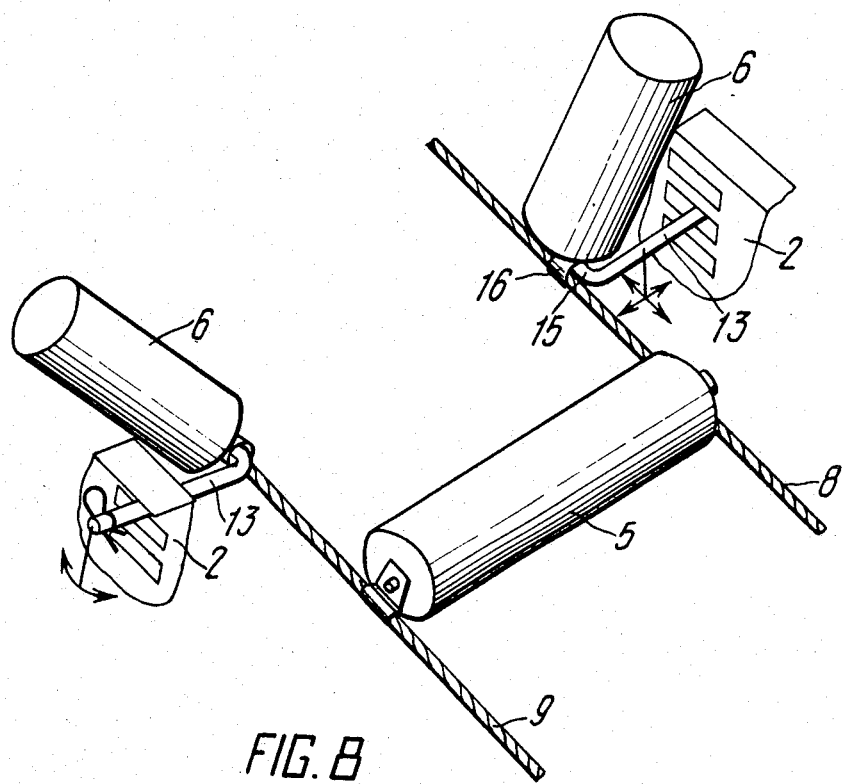
FIG. 8 illustrates the way the linking means are connected to the framework in an embodiment of the invention which provides for a rigid link between every rest and the pliable load-carrying member.

The linking means (tie rods) 13 must be connected each to the respective fulcrum pin 11 of the side idler 6 so as to form with the pin an angle of substantially 10°–65°. The reason why the side idler 6 must make with the medial idler 5 an angle $\beta$ which is 65° or less (FIG. 5) is that the belt troughing set up due to this angle cannot be further increased in most cases due to an inadequate resilience of belt material. Stress concentrations are produced at bends which lead to rapid belt wear. Moreover, an angle $\alpha$ which the tie rod 13 makes with the fulcrum pin 11 of the side idler 6 also cannot exceed 65° because of the position of the pivot 14 which cannot be located below a plane through the wire ropes. At the same time, the angle $\alpha$ cannot be less than a certain minimum or otherwise the ability of side idler 6 to tilt in the plane of the belt will be impeded. For example, when $\alpha = 0°$, the side idler 6 cannot tilt in the plane of the belt at all. The minimum angle which enables the side idler 6 to retain its ability to tilt is around 10°. The fulcrum pins 11 of the side idlers 6 are connected to the tie rods 13 through longitudinal rests 15 (FIGS. 3,4,7 and 8). The longitudinal rests 15 are secured to the wire ropes 8, 9 with the aid of clamps 16. The length of every clamp 16 can either equal that of the rest 15 (FIGS. 3 and 4) or be a fraction of the length of the rest 15 (FIGS. 7 and 8). The fulcrum pins 11 of the side idlers 6 can make each a right angle with that portion of the rest 15 which is linked to the wire ropes 8,9 through the clamp 16. This arrangement eliminates the need to keep an eye on the perpendicularity of the side idlers with respect to the wire ropes 8,9 in installing the conveyor. It also enables side idlers to tilt in the plane of the belt through a limited angle in proportion to the force $F_1$ applied to side idlers (FIG. 4).

The clamps 16 can be provided in a form permitting a relative displacement of the rests 15—integrally with the tie rods 13 and fulcrum pins 11 of the side idlers 6—and either of the two wire ropes 8 and 9 attached whereto are the rests 15. The pivots 14 must be provided in a form permitting each of the tie rods 13 to turn about its axis through a limited angle, to displace along its axis through a limited distance and swing in a plane at right angles to the conveyor axis (the direction of corresponding movements of components with respect to each other is shown by arrows in FIG. 7). This layout provides for controlling the position of the medial idlers 5 by varying the tension of the wire ropes 8, 9 without changing the position of the side idlers 6. For example, if the aligning effect of side idlers 6 is insufficient to correct a sidewise displacement of the belt 1, say to the right, the position of the wire rope 8 relative to the frame is changed, i.e. the rope is moved forward in the direction of belt travel, with the aid of a tensioning means 10 (FIG. 1) located on the right side. The displacement of the wire rope 8 causes the medial idlers 5 to turn counter-clockwise through an angle which sets these idlers out-of-square with the direction of travel of the belt 1. The angular displacement of the medial idlers 5 sets up a force which causes the belt 1 to reverse the direction of its sidewise displacement. This is the way an extra control of the position of the belt is excercised when the conveyor is in operation. The tensioning means 19 which are used to change the tension in, and the position of, the wire ropes 8,9 are located outside the frame 2 so as not to interfere with the operation of the belt. The side idlers remain in this case static and continue their belt-training function.

In another embodiment the way in which medial idlers 5 are adjusted for position, the rests 15 are rigidly attached to the wire ropes 8,9 at least within a portion of their length and the pivots 14 are provided each in a form permitting every tie rod 13 to displace along its axis and along the frame 2 and to turn about its axis through a limited angle (possible directions of motion of the tie rod 13 are shown by arrows in FIG. 8). The medial idlers 5 are adjusted for position in the same manner as in the former embodiment but the side idlers 6 travel along the frame 2 when the wire ropes 8,9 are being pulled.

The fulcrum pins 11 of side idlers 6 and the tie rods 13 can be attached to opposite ends of the rests 15 so that the fulcrum pins 11 trail the tie rods 13 in the direction of belt travel (FIGS. 3,4, 7 and 8). This feature of the design shortens the time lag of the side idlers 6 which tilt in the plane of the belt. Also the tilting of side idlers in the opposite direction due to inaccuracies in installing the conveyor or belt operation on inclines in loaded condition is prevented in this case. To simplify construction, the rests 15 can be made integrally with the tie rods 13.

The pivots 14 connecting the tie rods 13 to the frame 2 can be provided in a form permitting an adjustment of their position for height on the frame 2 (FIG. 8). This feature offers an extra may of controlling the angle which the side idlers 6 make with the axes of the medial idlers 5 in tilting. As already pointed out, an increase in the tilt of side idlers is conducive to restoring correct belt training and a decrease in the tilt has an adverse effect on the stability of belt travel. For an accurate belt training in operation, the tilt of side idlers must be expertly increased at one or other side of the belt. This control can be exercised without stopping the conveyor.

What is claimed is:

1. A belt conveyor comprising:
    a sturdy framework extending along the axis of the conveyor; at least two lengthy pliable load-carrying members which run inside said framework substantially parallel to each other and to the axis of the conveyor and are linked to said framework so as to get support in a given position relative thereto;
    a means of tensioning said pliable load-carrying members inside said framework; a plurality of medial rolling means which are located between said pliable load-carrying members substantially at right angles thereto and are spaced a distance apart from each other over the full length thereof;
    a plurality of fulcrum pins located substantially at right angles to said pliable load-carrying members so that the supporting ends of said fulcrum pins are connected to said pliable load-carrying members with provisions for displacing integrally therewith in the vertical and horizontal planes;
    a plurality of side rolling means which are fitted to said fulcrum pins on either side of said pliable load-carrying members outwards thereof and are spaced a distance apart from each other;
    a plurality of linking means each whereof is rigidly attached to the respective said fulcrum pin of side rolling means with one end so as to make an angle therewith and is pivoted to said framework with the other end with provision for unobstructed swinging in a plane at right angles to the axis of the conveyor;
    pivoting means which serve to connect the other ends of said linking means to said framework along the outward sides of said pliable load-carrying members substantially not below a plane therethrough;
    an endless conveyor belt receiving support from said medial rolling means and said side rolling means;
    a drive of said conveyor belt.

2. A belt conveyor as claimed in claim 1, wherein said linking means are connected to said framework with provision for turning about their axes through a limited angle.

3. A belt conveyor as claimed in claim 1, wherein said linking means are connected to said framework with provision for turning about their axes through a limited angle so as to enable said fulcrum pins of side rolling means to tilt relative to said pliable load-carrying members in the direction of belt travel through an angle of 0°–3° from the perpendicular.

4. A belt conveyor as claimed in claim 1, wherein said linking means are connected to said fulcrum pins of side rolling means so as to make an angle of 10°–65° therewith.

5. A belt conveyor as claimed in claim 1, wherein the supporting ends of said fulcrum pins of side rolling means are connected to said pliable load-carrying members through longitudinal rests which are secured to said pliable load-carrying means at least within a portion of their length, whereby this portion of their length is located at right angles to said fulcrum pins of side rolling means.

6. A belt conveyor as claimed in claim 5, wherein said rests are connected to said pliable load-carrying members with provision for a longitudinal displacement of said pliable load-carrying members relative to said rests, whereby said linking means are connected to said framework with provision for displacing therealong and for turning about their axes through a limited angle so as to enable said fulcrum pins of side rolling means to tilt relative to said pliable load-carrying members in the direction of belt travel through an angle of 0°–3° from the perpendicular.

7. A belt conveyor as claimed in claim 5, wherein said rests are rigidly connected to said pliable load-carrying members so that said rigid connection is effected within at least a portion of the length of said rests, whereby said linking means are connected to said framework with provision for displacing therealong and a limited displacing at right angles thereto and with provision for turning about their axes through a limited angle.

8. A belt conveyor as claimed in claims 6 and 7, wherein said fulcrum pins of side rolling means and said linking means are rigidly connected to said rests at opposite ends thereof so that said fulcrum pins of side rolling means trail said linking means in the direction of belt travel.

9. A belt conveyor as claimed in claim 8, wherein every said fulcrum pin of side rolling means forms with every said linking means and every said rest which are associated therewith a single unit.

10. A belt conveyor as claimed in claim 1, wherein the other ends of said linking means are connected to said framework with provision for adjusting their position in the vertical on said framework.

* * * * *